(12) United States Patent
Brooks et al.

(10) Patent No.: US 8,549,905 B2
(45) Date of Patent: Oct. 8, 2013

(54) SIMULATING DOWNHOLE FLOW THROUGH A PERFORATION

(75) Inventors: James E. Brooks, Manvel, TX (US); Dennis Haggerty, Burleson, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 495 days.

(21) Appl. No.: 12/775,408

(22) Filed: May 6, 2010

(65) Prior Publication Data

US 2011/0271751 A1 Nov. 10, 2011

(51) Int. Cl.
*E21B 49/02* (2006.01)

(52) U.S. Cl.
USPC .......................................... 73/152.07; 175/50

(58) Field of Classification Search
USPC ....................................................... 73/152.07
See application file for complete search history.

(56) References Cited

U.S. PATENT DOCUMENTS

| | | | |
|---|---|---|---|
| 4,805,726 A | | 2/1989 | Taylor et al. |
| 5,984,023 A | * | 11/1999 | Sharma et al. .................. 175/50 |
| 6,220,371 B1 | * | 4/2001 | Sharma et al. .................. 175/50 |
| 6,598,682 B2 | | 7/2003 | Johnson et al. |
| 7,861,609 B2 | | 1/2011 | Haggerty et al. |
| 2009/0318779 A1 | * | 12/2009 | Tran ............................. 600/301 |
| 2011/0191029 A1 | * | 8/2011 | Jalali et al. ........................ 702/6 |

OTHER PUBLICATIONS

Brooks, James E., et al., Patent Application entitled "Simulating Downhole Flow Through a Perforation", filed Oct. 11, 2012, U.S. Appl. No. 13/650,124.
Brooks, James E., "Productivity calculations using method of sources and sinks," "Computer Aided Optimum Design of Structures VIII," pp. 145-158, published by WIT Press, 2003.

* cited by examiner

*Primary Examiner* — Hezron E Williams
*Assistant Examiner* — Rodney T Frank

(57) ABSTRACT

A method of testing a core sample is provided. The method comprises determining an impedance map, attaching a sleeve to the core sample, and measuring a flow performance of the core sample. An impedance of each of a plurality of portions of the sleeve is based on the impedance map.

13 Claims, 12 Drawing Sheets

SIMULATING DOWNHOLE FLOW THROUGH A PERFORATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbons may be produced from wellbores drilled from the surface through a variety of producing and non-producing formations. The wellbore may be drilled substantially vertically or may be an offset well that is not vertical and has some amount of horizontal displacement from the surface entry point. In some cases, a multilateral well may be drilled comprising a plurality of wellbores drilled off of a main wellbore, each of which may be referred to as a lateral wellbore. Portions of lateral wellbores may be substantially horizontal to the surface. In some provinces, wellbores may be very deep, for example extending more than 10,000 feet from the surface.

A variety of servicing operations may be performed on a wellbore after it has been initially drilled. A lateral junction may be set in the wellbore at the intersection of two lateral wellbores and/or at the intersection of a lateral wellbore with the main wellbore. A casing string may be set and cemented in the wellbore. A liner may be hung in the casing string. The casing string may be perforated by firing a perforation gun or perforation tool. A packer may be set and a formation proximate to the wellbore may be hydraulically fractured. A plug may be set in the wellbore.

Perforation tools may comprise explosive charges that are detonated to fire the perforation tool, perforate a casing if present, and create perforations and/or tunnels into a subterranean formation proximate to the wellbore. The tunnels into the subterranean formation may be surrounded by an envelope or layer of crushed material. The crushed material may shift and/or flow into the tunnels, clogging the tunnels to some extent, or may realign and reduce the permeability of the formation proximate to the tunnels. A variety of perforation tool design parameters can be adjusted with the intention of encouraging desired results and mitigating undesired results of the perforation. A density of shots into the subterranean formation can be adjusted. An angle of the focus axis of the explosive charges can be adjusted to angle up, to angle down, or to angle normal to the axis of the perforation tool. Parameters of the explosive charge itself may be altered to adapt to different downhole parameters.

Sometimes downhole perforation procedures are conducted with pre-firing wellbore pressure maintained below the formation fluid pressure, which may be referred to as an under balanced condition, or maintained above the formation fluid pressure, which may be referred to as an over balanced condition. Sometimes a tool may be carried with the perforation tool or incorporated into the perforation tool to create a transient fluid surge after firing of the perforation tool to supplement or prolong an under balanced condition. The perforation procedure may be designed to adapt to different perforation conditions based on estimations and/or projections of downhole parameters. For example, a pre-firing wellbore pressure may be calculated to provide a specific intensity of under balance or over balance. In the case an under balance condition is desired, a volume of fluid surge may be calculated.

In order to design the perforation tool and/or a downhole perforation procedure, one or more core samples that are considered to be representative of the subterranean formation to be perforated may be tested to determine some parameters of the subterranean formation and/or interactions between the explosive charges and the subterranean formation. The evaluations of test results may be used in designing the perforation tool and/or the downhole perforation procedure.

SUMMARY

In an embodiment, a method of testing a core sample is disclosed. The method comprises determining an impedance map, attaching a sleeve to the core sample, and measuring a flow performance of the core sample. A flow impedance of each of a plurality of portions of the sleeve is based on the impedance map.

In an embodiment, a perforation test target is disclosed. The perforation test target comprises a metal plate, a core sample adhered to the metal plate at one end, and a first sleeve adhered to the core sample. A flow impedance of each of a plurality of portions of the first sleeve is based on a predetermined impedance map.

In an embodiment, a system for testing a core sample is disclosed. The system comprises a non-permeable sleeve placed over the core sample, a first pair of opposing actuators to apply opposing force to the non-permeable sleeve in a first axis normal to the axis of the core sample, and a second pair of opposing actuators to apply opposing force to the non-permeable sleeve in a second axis normal to the axis of the core sample and normal to the first axis. The system further comprises a wellbore pressure reservoir to provide simulated wellbore pressure and a formation pressure reservoir to provide simulated formation fluid pressure.

In an embodiment, a perforation test target is disclosed. The perforation test target comprises a metal plate and a core sample adhered to the metal plate at one end, wherein the core sample has the shape of an elliptic cylinder. In an embodiment, a major radius of a cross-section of the core sample is at least 1.1 times a minor radius of the cross-section of the core sample. In an embodiment, the perforation test target further comprises a sleeve adhered to the core sample, wherein a flow impedance of each of a plurality of portions of the sleeve is based on an impedance map. In an embodiment, the impedance map is determined based on at least one of a formation parameter, a perforation parameter, a wellbore parameter, and a core sample parameter.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
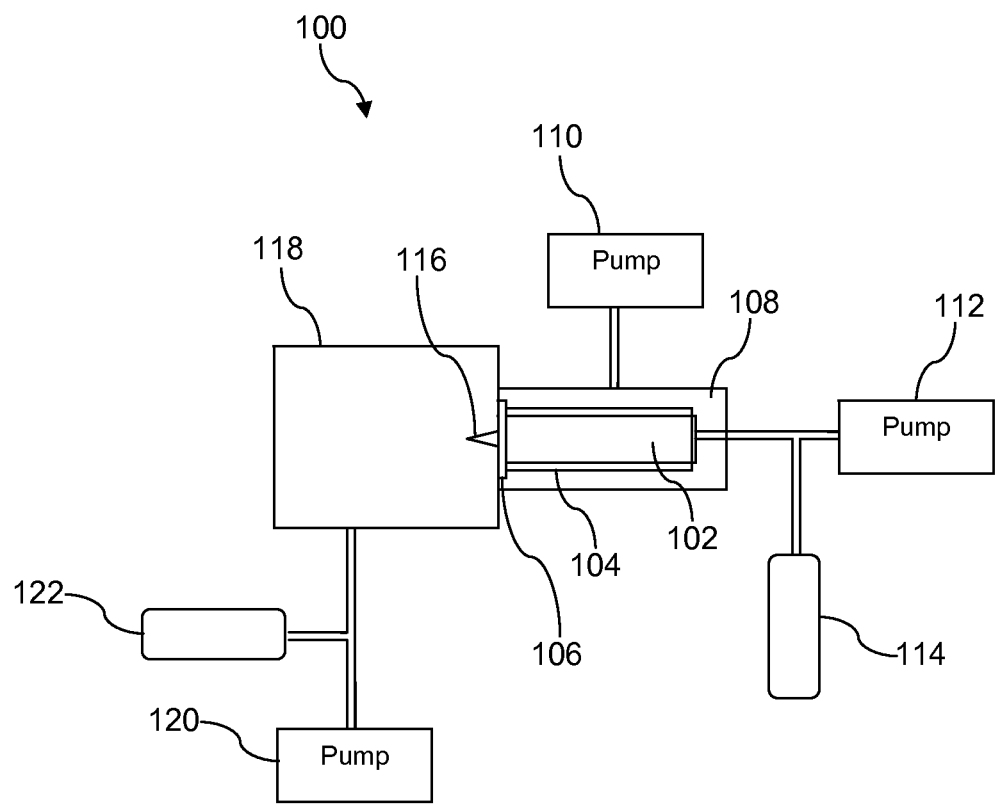
FIG. 1 is an illustration of a small scale test fixture according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "upstream" meaning toward the surface of the wellbore and with "down," "lower," "downward," or "downstream" meaning toward the terminal end of the well, regardless of the wellbore orientation. The term "zone" or "pay zone" as used herein refers to separate parts of the wellbore designated for treatment or production and may refer to an entire hydrocarbon formation or separate portions of a single formation such as horizontally and/or vertically spaced portions of the same formation. The various characteristics mentioned above, as well as other features and characteristics described in more detail below, will be readily apparent to those skilled in the art with the aid of this disclosure upon reading the following detailed description of the embodiments, and by referring to the accompanying drawings.

Testing of core samples is conducted to evaluate and to adjust perforation gun design parameters and perforation procedure parameters. Testing may be conducted based on American Petroleum Institute (API) reference procedure 19B (API RP 19B). Testing is typically performed on a circular cylinder core sample that is considered to be representative of the subterranean formation that is to be perforated. One end of the core sample is adhered to a metal plate representing a wellbore casing. An explosive charge is placed proximate to and focused on the metal plate and the core sample. A pressure is applied to the housing containing the explosive charge and/or the metal plate to model the wellbore pressure. Pressure is applied to the core sample surfaces that are not adhered to the metal plate to model one or more of formation overburden pressure (static pressure from the rock matrix exerted on any subject volume of the formation) and formation fluid pressure (pressure from hydrocarbons such as oil, gas, and/or water that may be a static pressure prior to perforation but may be dynamic pressure after perforation as the fluids flow). In some contexts, formation fluid pressure may be referred to as pore pressure and/or formation pore pressure.

An explosive charge, for example a shaped explosive charge suitable for assembling into a perforation gun, is detonated, perforating the metal plate, perforating the core sample, leaving a perforation tunnel enveloped by a layer of crushed rock in the core sample. After the explosive charge is fired, the fluid pressure desirably causes fluid flow into the tunnel and out the perforation hole in the metal plate. During the test, various pressures and flows are measured and recorded for post-test evaluation. After the test, the core sample may be removed from the test fixture, split and/or sawed open, and the perforation tunnel and crush zone geometry measured and evaluated.

In one test, which may be referred to as a radial target test, the core sample may be tested to measure radial flow, fluid flow from the formation across a circumferential boundary of the core sample and through an end of the core sample. In another test, which may be referred to as an axial target test, the core sample may be tested to measure axial flow, fluid flow from the formation across a boundary defined by the end of the core sample opposite the metal plate. In these two tests, however, a number of the test conditions differ significantly from the downhole environment that the testing is intended to model. The present disclosure teaches several innovations any one of which may contribute to more faithfully model the downhole environment and may promote improved perforation design and improved perforation procedure design based on the results of the more realistic testing.

In the radial target test, a constant fluid pressure is applied across the surfaces of the core sample not adhered to the metal plate. This differs from the downhole environment in that, after perforation and when fluid flows into the perforation tunnels, a fluid pressure distribution is present across the circumferential surface of the corresponding volume in the downhole environment, that is, the fluid pressure is different at different points or locations on the circumferential surface and/or at the end. This fluid pressure may differ with displacement axially from one end of the corresponding volume to the other end of the corresponding volume as well as circumferentially around the corresponding volume.

In the axial target test, a constant fluid pressure is applied to the end of the core sample opposite the metal plate to model formation fluid pressure. An impermeable sleeve may be placed around the circumference of the core sample to prevent fluid flow through the circumferential surface of the core sample.

The present disclosure teaches a plurality of different innovations for providing more faithful modeling of the downhole environment in the testing laboratory. It is contemplated that some of the disclosed embodiments may desirably be used in combination, but several of the innovations may suitably be employed separately from the other innovations. These innovations are briefly sketched here but are described in detail supported by the corresponding drawings. In an embodiment, an impedance sleeve is placed over the core sample prior to radial target testing, wherein the flow impedance of each of a plurality of portions of the sleeve may be different, based on an impedance map. The impedance map may be determined, for example, based on any of one or more formation parameters, one or more perforation gun parameters, one or more wellbore parameters, and one or more core sample parameters. After detonation of the explosive charge, fluid may flow across the impedance sleeve, through the core sample, and into the perforation. In the presence of fluid flow, the impedance sleeve transforms the constant ambient pressure applied to the outside of the impedance sleeve to a variety of different fluid pressure values incident on the surface of the core sample, based on the different flow impedances of the portions of the sleeve. The flow impedance of each of the portions of the sleeve may be collectively referred to as an impedance distribution of the sleeve. This impedance distribution can be calculated based on known or estimated parameters, and the sleeve manufactured according to the impedance distribution and/or the impedance map.

In an embodiment, the impedance sleeve may be combined with an elliptical cylinder core sample. The elliptical cross-section of the core sample can be adapted to provide a desired difference of pressure around an internal circular cross-section of the core sample by selecting an appropriate ratio between major radius and minor radius of the elliptical cross-section, for example a ratio of 1.1 to 1, 2 to 1, or some other effective ratio, in accordance with the ratio of permeability anisotropy of the core sample material. When combined with such an elliptical cylinder core sample, the impedance sleeve may be manufactured to have flow impedance varying only in the axial direction, possibly reducing the complexity of manufacturing the impedance sleeve and of mounting the impedance sleeve over the core sample. A core sample lathed to have a generally and/or substantially elliptic cylinder shape is thought to be novel and to have applicability in testing independently of the impedance sleeve.

In an embodiment, a compliant sleeve having compliance that varies in the radial direction may be placed over a core sample assembly. Mechanical compliance, the compliance referred to herein, may be defined as the inverse of mechanical stiffness. The compliance of each of a plurality of different portions of the compliance sleeve may have different values at different locations on a perimeter of a cross-section of the core sample that is normal to the axis of the core sample, may be placed over a core sample assembly. A constant overburden pressure applied to the compliant sleeve is transformed by the compliant sleeve into a pressure that varies in the radial direction applied to the core sample assembly. At a portion of the compliant sleeve where the compliance is reduced, less of the overburden pressure is transferred to the core sample assembly; at a portion of the compliant sleeve where the compliance is greater, more of the overburden pressure is transferred to the core sample assembly.

In an embodiment, a test fixture is contemplated having two pairs of opposing actuators to apply forces in the horizontal and the vertical directions to a core sample to model overburden pressure in the horizontal and vertical axes. In an embodiment, the force applied by the two pairs of opposing actuators may be controlled separately in the horizontal and the vertical directions, for example to model a difference between vertical overburden pressure and horizontal overburden pressure. The actuators may be hydraulically actuated or electrically actuated.

Turning now to FIG. 1, a test system 100 is described. The system 100 comprises a core sample 102, an impedance sleeve 104, a metal plate 106, a first pressure chamber 108, a first pump 110, a second pump 112, and a first pressure accumulator 114. The metal plate 106 may be a section of casing, such as casing approximating that used in the wellbore to be perforated. Additionally, cement (not shown) may be located between the metal plate 106 and the core sample 102, such as cement approximating the cement used in the wellbore to be perforated. The system 100 further comprises an explosive charge 116, a second pressure chamber 118, a third pump 120, and a second pressure accumulator 122. A variety of measurement and sensing equipment (not shown) may be coupled to the system 100 to measure fluid pressures, fluid flows, and other conditions before, during, and after the detonation of the explosive charge 116. Likewise, a variety of control equipment (not shown) may be coupled to the system 100 to trigger the detonation of the explosive charge 116, to control the pumps 110, 112, 120, and to control other test apparatus. In different embodiments, the system 100 may have different components and/or arrangements of components than that illustrated in FIG. 1. In some contexts, the assembly of the core sample 102, the impedance sleeve 104, and the metal plate 106 may be referred to as a perforation test target.

The first pump 110 is plumbed by tubing to the first pressure chamber 108 and provides pressure, for example, to model formation overburden pressure. In some test configurations, formation overburden pressure may not be modeled, and the first pump 110 may be omitted from the system 100 in this circumstance.

The second pump 112 is plumbed by tubing to the end of the core sample 102. The second pump 112 may provide fluid pressure and fluid flow to model formation fluid pressure and fluid flow after the perforation has occurred. In an embodiment, the core sample 102 and impedance sleeve 104 may be enclosed within an impermeable bladder (not shown) that separates the first pressure chamber 108 from the core sample 102 and impedance sleeve 104, and the second pump 112 may provide pressure to the interior of this impermeable bladder. In an embodiment, proppant material may be disposed between the impermeable bladder and the impedance sleeve 104. The second pump 112 is also plumbed by tubing to the first pressure accumulator 114. The first pressure accumulator 114 mitigates pressure transients during fluid flow transients.

The explosive charge 116 is similar to or identical to an explosive charge that may be deployed in a perforation gun. The explosive charge 116 may be enclosed in a housing for use in core sample testing, where the free volume inside the housing is adapted to model the free volume inside the simulated perforation gun. The explosive charge 116 may comprise a liner, an outer shell, and a shaped charge between the liner and the outer shell. The explosive charge 116, when detonated, produces an intense energetic jet focused along the axis of the explosive charge 116. The energetic jet perforates the metal plate 106, perforates the cement, and perforates the core sample 102. Depending on the explosive charge 116 employed, the diameter of the perforation in the metal plate 106, the depth of the tunnel, the diameter of the tunnel, and the diameter of the zone of crushed rock surrounding the tunnel produced by detonation of the explosive charge 116 may vary. The diameter of the perforation in the metal plate 106, the depth of the tunnel, the diameter of the tunnel, and the diameter of the zone of crushed rock may be referred to in some contexts as perforation geometry. It may be one of the objectives of testing to evaluate the effects of different explosive charges 116 on the core sample 102. A series of tests may be conducted with different explosive charges 116 to identify a suitable match of the design of the explosive charge 116 to the core sample 102.

The third pump 120 is plumbed by tubing to the second pressure chamber 118 and provides pressure, for example, to model wellbore pressure. The third pump 120 is also plumbed by tubing to the second pressure accumulator 122. The second pressure accumulator 122 mitigates pressure transients during fluid flow transients. The pressure supplied by the third pump 120 may be regulated to provide an under balanced pressure, an over balanced pressure, or a balanced pressure prior to detonating and/or firing the explosive charge 116. In an embodiment, the second pressure accumulator 122 may be replaced by a surge apparatus to promote surging the second pressure chamber 118 after the perforation, for example to produce or sustain an under balance pressure in the second pressure chamber 118.

In an embodiment, the first pressure accumulator 114 may be replaced by a surge device. For example, a surge device having a piston, a pressurized gas chamber, a low pressure chamber, and a crushable spring designed to provide a specific pressure transient after perforation may be used. For further details of an exemplary surge device, see U.S. Pat. No. 4,805,726. When activated, for example shortly after the explosive charge 116 is detonated, the pressurized gas chamber, previously isolated from the low pressure chamber, is admitted to the low pressure chamber through an orifice. The decreased pressure of the pressurized gas chamber allows the piston to be forced back onto the crushable spring by an in-flow of fluid. The mass of the piston, the properties of the crushable spring, the internal volume of the pressurized gas chamber and of the low pressure chamber, the diameter of an orifice between the pressurized gas chamber and the low pressure chamber can be selected to provide a desirable pressure transient. The pressure transient that occurs in the absence of the surge device may be measured in a previous iteration of core sample testing. Alternatively, the pressure transient that occurs in the absence of the surge device may be determined by simulation and/or calculations. A desired pressure transient may be determined that differs from the pressure transient that occurs in the absence of the surge device, and the piston mass, the volume of the interior chamber, and the spring constant of the crushable spring may be designed and/or selected to produce the desired pressure transient. Activating the surge device to accept a sudden in-flow of fluid during the pressure transient that results from perforation, to perform a surge, is said to modify the pressure transient and/or to shape the pressure transient. The surge device may be said to modify the pressure transient and/or to produce a modified pressure transient.

In an embodiment, the surge device coupled to the second pump 112 may promote simulating a transient cleanup flow, for example a pressure transient that may be limited to about 10 milliseconds, about 100 milliseconds, about 300 milliseconds, about 1 second, or some other transient time interval. By providing a transient reduction in pressure incident on the impedance sleeve 104, the effect of a transient period of clean-up of the crush zone after perforation may be created. In an embodiment, the second pressure accumulator 122 may be replaced by a surge device such as that described above having a piston, a crushable spring, a high pressure gas chamber, a low pressure gas chamber in order to provide tuning and/or adaptation of the transient pressure in the second pressure chamber 118. Likewise, when used in conjunction with the second pressure chamber 118, the surge device may be used to shape the wellbore pressure transient to simulate downhole conditions after perforation has occurred.

Figure 2:
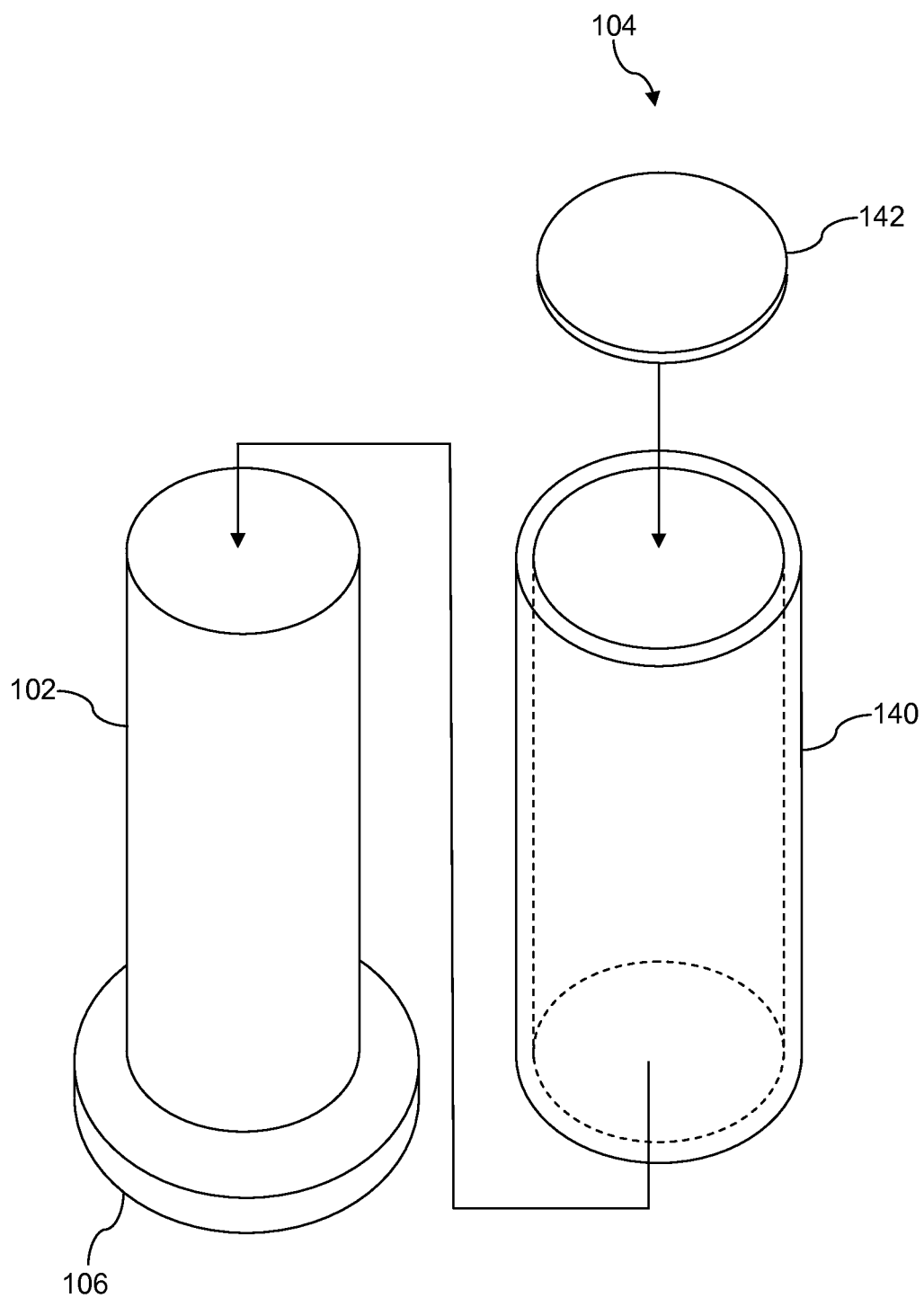
FIG. 2 is an illustration of a core sample and an impedance sleeve according to an embodiment of the disclosure.

Turning now to FIG. 2, further details of the impedance sleeve 104 are described. In an embodiment, the impedance sleeve 104 may be comprised of a tubular portion 140 that is slipped over the outside of the core sample 102 and further comprised of a cap portion 142 that is placed on the end of the core sample 102 and overlapping or adjacent to the end of the installed tubular portion 140. The tubular portion 140 and the cap portion 142 may be manufactured of filter material, for example different layers of filter paper as described further below, or of variable thickness ceramic. In some contexts, the variable thickness of the ceramic sleeve may be referred to as a geometry of the ceramic sleeve. The tubular portion 140 and/or the cap portion 142 may be comprised of fine particle materials, for example a filter cake comprised of fine particle materials, for example fine silt, fine sand, fine clay, and other fine particles. The selection of particles, selection of materials, the thickness of the filter cake, the method of manufacturing the filter cake may be adapted to produce the impedance sleeve 104, or the tubular portion 140 and/or the cap portion 142, having the desired flow impedance at each portion of impedance sleeve 104.

The tubular portion 140 may be manufactured to fit the core sample 102 snuggly, to avoid any fluid infiltrating under the ends of the tubular portion 140 rather than passing through the outer surface of the tubular portion 140. In an embodiment, the ends of the tubular portion 140 may be secured to the core sample 102, for example using snap rings, clamps, wires, strings, and/or other attaching hardware. In an embodiment, the tubular portion 140 may be adhered to the core sample 102, for example at a limited number of interior areas of the tubular portion 140 so as to avoid the interference of the adhesive with the predetermined impedance of the tubular portion 140. Alternatively, the impedance sleeve 104 may be secured to the core sample 102 by a support sleeve that is highly permeable and functions to hold the impedance sleeve 104 in place and mitigate fluid infiltrating under the ends of the tubular portion 140. In an embodiment, the tubular portion 140 may be slipped over the core sample 102, and the core sample 102 and the adjacent end of the tubular portion 140 may then be cemented to the metal plate 106, thereby securing the end of the tubular portion 140 proximate to the metal plate 106.

In an embodiment, the flow impedance of the cap portion 142 may be constant across the cap portion 142. Alternatively, in another embodiment, the flow impedance of the cap portion 142 may vary from the center of the cap portion 142 out to the edges of the cap portion 142, for example having a greater flow impedance towards the curved perimeter of the end cap 142 and a lesser flow impedance towards the center of the end cap 142.

The tubular portion 140 is manufactured so that different portions, parts, or areas of the tubular portion 140 may have different values of flow impedance. In some contexts, the tubular portion 140 may be said to have an impedance distribution, meaning a variety of different flow impedance values at different points or areas of the tubular portion 140. In an embodiment, the flow impedance of different portions located on the same cross-section normal to the axis of the tubular portion 140 have substantially the same value while the flow impedance of different portions located on the same line parallel to the axis of the tubular portion 140 may be different. Described in a different manner, in an embodiment, the flow impedance of different portions may depend on axial position (vary based on axial position) and be independent of radial position (have the same value on any cross-section normal to the axis). Alternatively, in an embodiment, the flow impedance of different portions may vary based on both axial position and radial position.

The impedance distribution may be determined to transform a constant surface fluid pressure incident on the outside of the tubular portion 140 to a non-constant fluid pressure distribution on the surface of the core sample 102 when fluid is flowing. In some contexts, the impedance distribution may be defined by an impedance map. The impedance map may define an impedance value corresponding to each portion, or part, or area of the tubular portion 140. In an embodiment, the impedance map may be considered to have three dimensions, an axial domain dimension, a radial domain dimension, and an impedance range dimension. The axial domain may take values from 0 to the length of the core sample 102, for example from 0 inches to 24 inches, in the case where the length of the core sample is 24 inches long. The radial domain may take values from 0 degrees to 360 degrees, from 0 radians to $2\pi$ radians, or some other known angular unit. As is known to those of skill in the art, the 0 degree and the 360 degree positions coincide, and the 0 radians and the $2\pi$ radians positions coincide, as the circular cross-section of the tubular portion 140 is cyclical. In an embodiment, the infinite number of points on the surface of the tubular portion 140 may be abstracted as a finite number of portions, areas, or parts of the surface. The number of portions, areas, or parts into which the tubular portion 140 may be abstracted may be determined by one skilled in the art and may be based on the methods employed to manufacture the tubular portion 140. Greater numbers of portions may provide more finely resolved modeling of the downhole environment but may also entail greater complexity of manufacturing and/or of design. Fewer numbers of portions may provide less resolved modeling of the downhole environment but may be easier to manufacture and/or design.

A flow impedance value corresponding to a portion of the tubular portion may be calculated as:

$$z = \frac{P}{v} \propto \frac{t}{k} \quad \text{(Eq. 1)}$$

where z is the flow impedance at the subject portion, v is the estimated fluid velocity across the boundary of a virtual surface of the rock in the subterranean formation that the core sample 102 is intended to simulate after perforation, and P is the pressure difference at the subject portion between the estimated formation fluid pressure prior to perforation and the estimated pressure at the boundary of the corresponding volume after perforation. How these velocities and pressures may be estimated is discussed further below. In the right hand proportion, k is the permeability at the subject portion and t is the thickness of the subject portion. Because the subject portion may be extended in length and width, some of the parameters above may vary across points of the subject portion, and in this case an average of the parameter across the subject portion may be used. In an alternative form, design impedance may be calculated as:

$$z = c\frac{t}{k} \quad \text{(Eq. 2)}$$

where z, t, and k are as defined with reference to Eq. 1, and where c is a proportionality constant that will be readily determined by one skilled in the art, based on the units employed and based on the subject fluid viscosity. The calculations to determine impedance may be performed at every portion to define a complete impedance map that can be used to manufacture the tubular portion 140 so that corresponding portions of the tubular portion 140 have the flow impedance defined by the impedance map.

Figure 3:
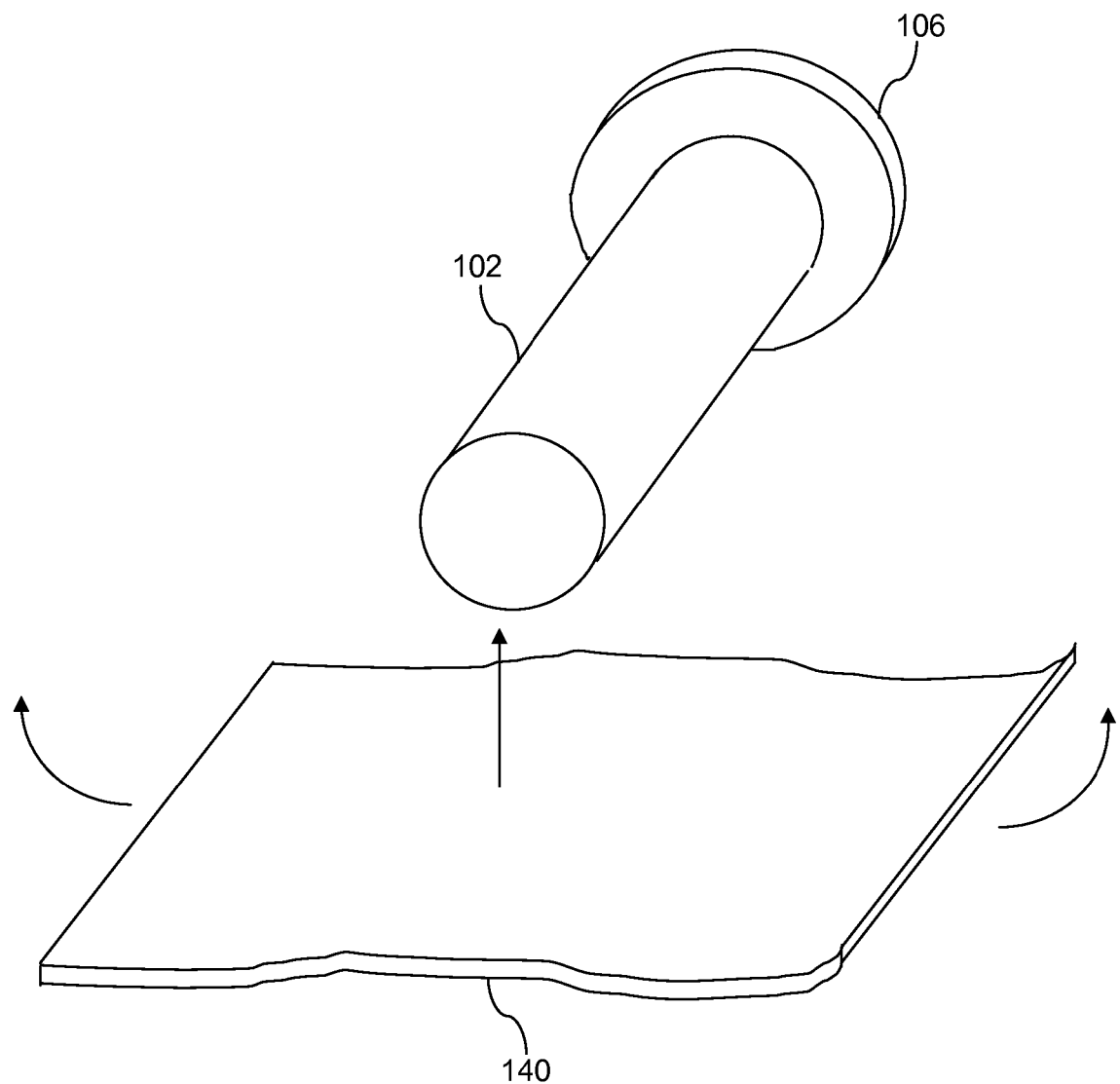
FIG. 3 is an illustration of a core sample and an impedance sleeve manufactured in the form of a sheet according to an embodiment of the disclosure.

Turning now to FIG. 3, an alternative embodiment of the tubular portion 140 is described. In an embodiment, the tubular portion 140 may be manufactured or constructed as a sheet and rolled around the core sample 102. The tubular portion 140 may be adhered to the core sample 102 at a limited number of points or secured to the core sample 102, for example using snap rings, clamps, wires, strings, and/or other attaching hardware. Alternatively, the tubular portion 140 may be secured to the core sample 102 by a support sleeve that is highly permeable and functions to hold the impedance sleeve 104 in place and mitigate fluid infiltrating under the ends of the tubular portion 140. After the tubular portion 140 is attached to the core sample 102, the cap portion 142 may be attached to the core sample 102.

Figure 4A:
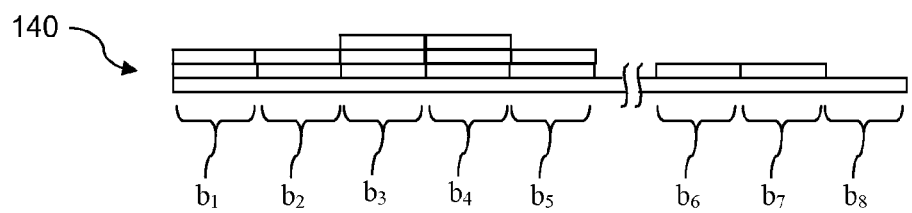
FIG. 4A is an illustration of an impedance sleeve manufactured as a sheet comprising layers of impedance material according to an embodiment of the disclosure.
Figure 4B:
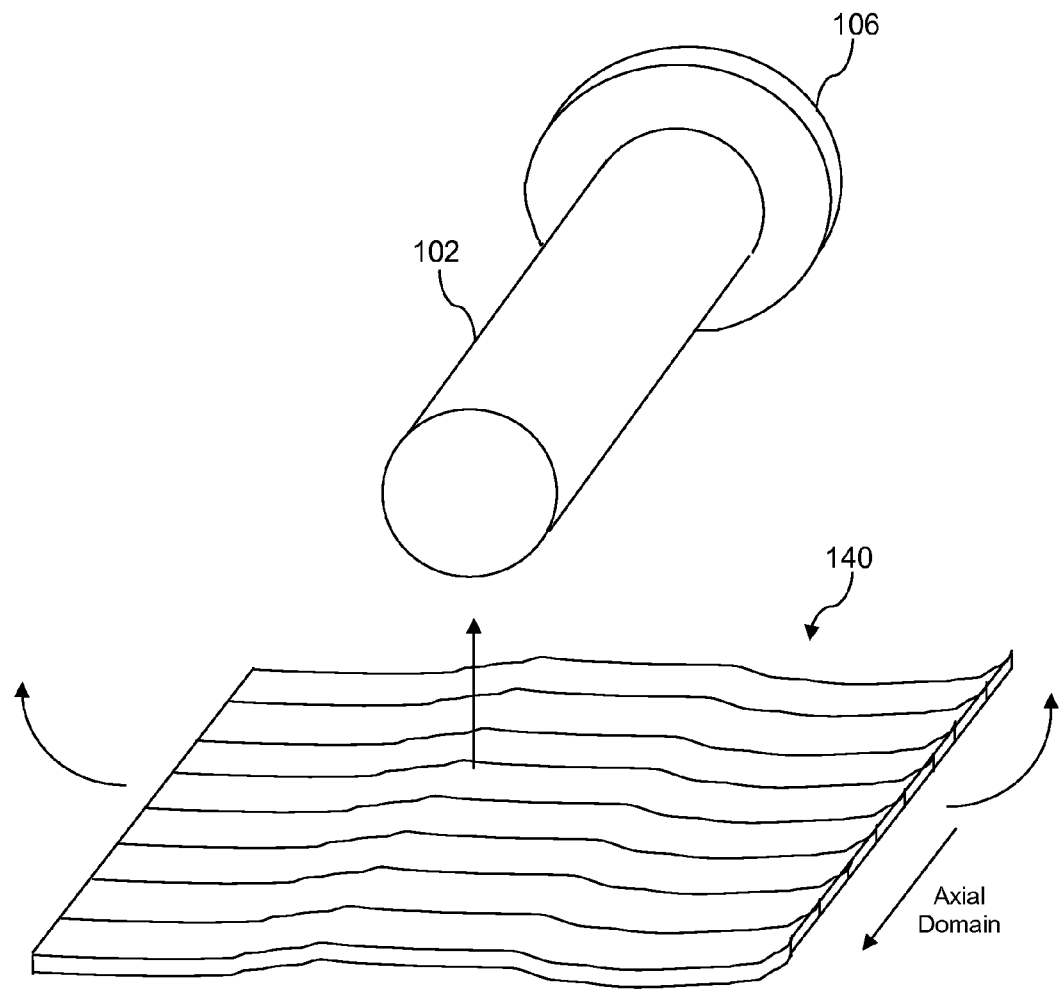
FIG. 4B is an illustration of an impedance sleeve manufactured as a sheet according to an embodiment of the disclosure.
Figure 4C:
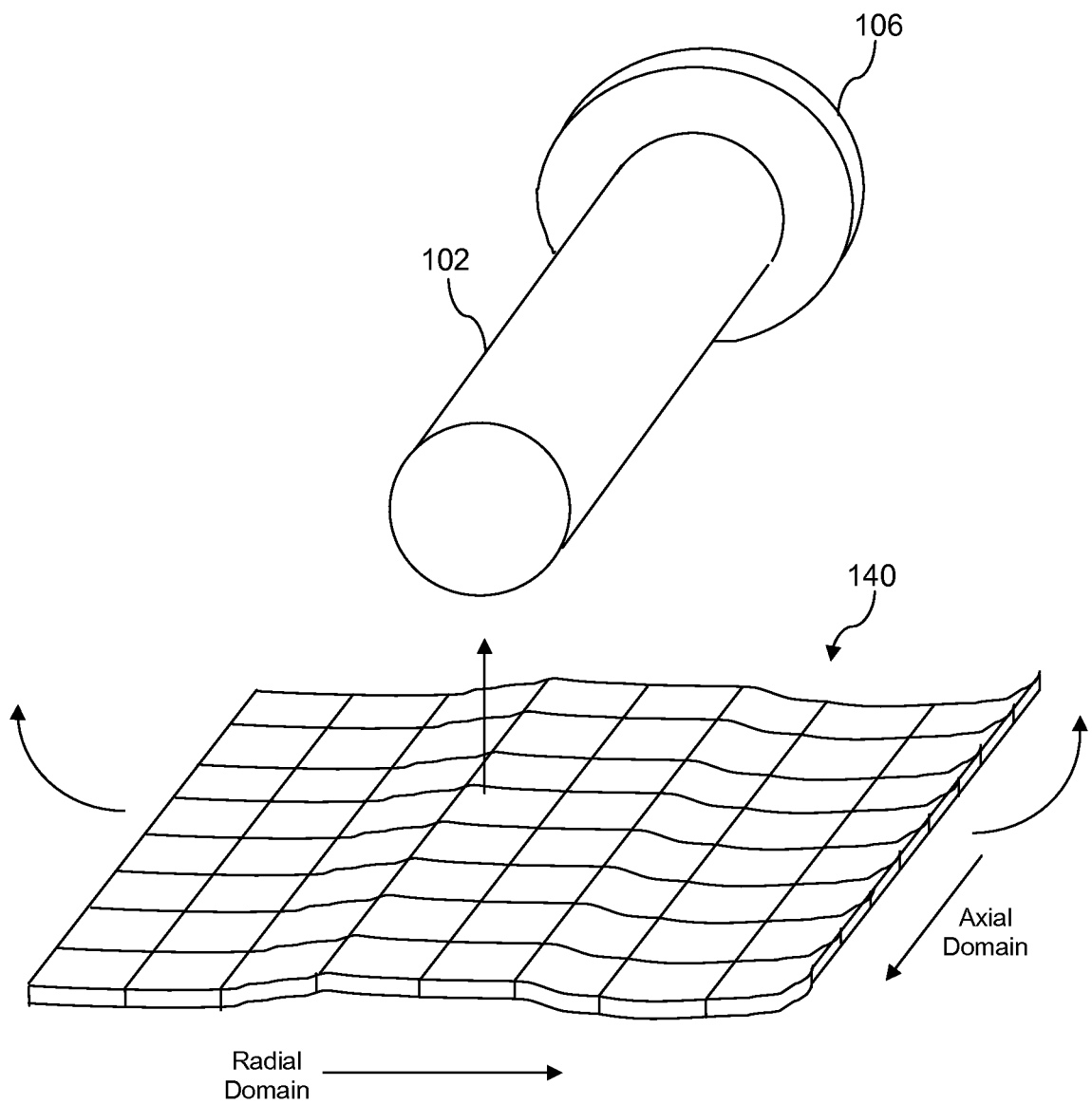
FIG. 4C is an illustration of an impedance sleeve manufactured as a sheet according to an embodiment of the disclosure.

Turning now to FIG. 4A, FIG. 4B, and 4C, an embodiment of the tubular portion 140 is described. The tubular portion 140 may be manufactured by overlaying a plurality of strips of filter material over a single sheet of filter material. For example, strips of filter paper may be overlaid at bands $b_1$ through $b_8$. As illustrated, each single strip of filter material may have the same impedance, the thickness of bands $b_3$ and $b_4$ may be 4, the thickness of bands $b_1$, $b_2$, and $b_5$ may be 3; the thickness of bands $b_6$ and $b_7$ may be 2; and the thickness of band$_8$ may be 1, where the units of thickness are abstracted away and a thickness of 1 corresponds to a single layer of the selected filter material. One skilled in the art will readily appreciate that by thoughtful selection of a filter material having a specified impedance and by layering strips of that filter material as illustrated in FIG. 4A, a tubular portion 140 may be manufactured that has different flow impedance at different portions of the tubular portion 140. Additionally, the strips may be formed from filter material having different impedance. For example, the tubular portion 140 may be assembled from varying numbers of strips formed from a first filter material having a first impedance, a second filter material having a second impedance, and a third filter material having a third impedance. By varying the number of layers of strips and varying the impedance of strips by using different filter materials, a range of impedance values can be achieved.

It will be appreciated that the impedance distribution of the tubular portion 140 is associated with and/or related to the ratio of the local sleeve thickness to the local permeability. For a tubular portion 140 manufactured from a material of a uniform permeability, the impedance distribution would be proportional to the local thickness. It is understood that permeability is inversely proportional to impedance, thus a filter material having uniform impedance likewise has uniform permeability. Additionally, given a filter material impedance and a thickness of the filter material, a permeability of the filter material may be determined; and given a filter material permeability and a thickness of the filter material, an impedance of the filter material may be determined.

In FIG. 4B, a tubular portion 140 is illustrated whose flow impedance values depend and/or vary based only on axial position. Flow impedance at different axial positions may be different, depending on the layers of strips of filter material and the impedance of the possibly different filter materials used to build up layers of strips. If the tubular portion 140 is traversed circumferentially, remaining at the same axial position, the same numbers of strips of filter material are traversed and hence the impedance value would remain the same.

The idea of building up the tubular portion 140 by layering strips can be extended to three dimensions, so a strip may be composed of a plurality of squares or rectangles, as illustrated in FIG. 4C. In the tubular portion 140 illustrated in FIG. 4C, impedance can be made to be different at each rectangle, and hence the impedance may vary with both axial position and radial position. In some embodiments the increased complexity of manufacturing the tubular portion 140 as a plurality of squares or rectangles as illustrated in FIG. 4C may not provide sufficient benefit versus the simpler manufacturing process involved in making the tubular portion 140 as a plurality of strips as illustrated in FIG. 4B. In an embodiment, the portions of FIG. 4C may be formed of other shapes, for example, rhomboidal shapes or hexagonal shapes.

Figure 5:
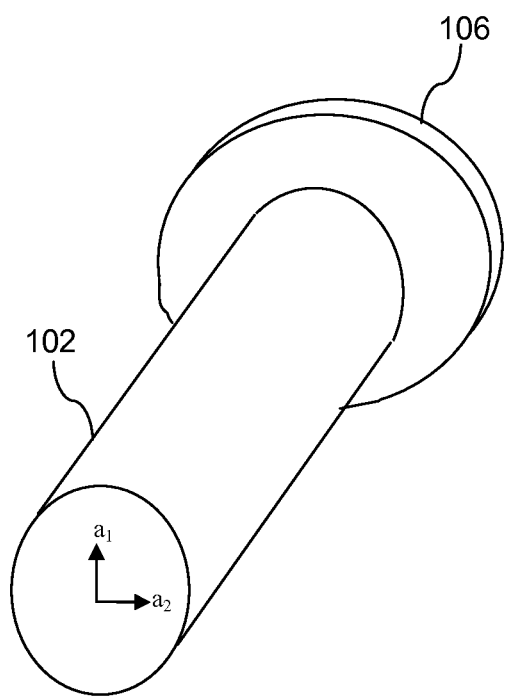
FIG. 5 is an illustration of a core sample having an elliptical cross-section according to an embodiment of the disclosure.

Turning now to FIG. 5, a core sample 102 having the form of an elliptical cylinder is described. The major radius of the core sample 102 as illustrated is in the direction of $a_1$ and the minor radius is in the direction of $a_2$. In an embodiment, the ratio of the major radius to the minor radius can be designed to provide a desired variation of fluid pressure that varies with radial position in accordance with the core sample's permeability anisotropy. Using the core sample 102 having the form of an elliptical cylinder may allow testing to be conducted using the more simply manufactured tubular portion 140 of FIG. 4B while still providing the enhanced realism of varying fluid pressure in both axial and radial domains. For example, at an interior of the core sample 102 having a circular cross section, there will be more core material to pass through inwards along the major radius of the elliptical cross-section than on the path inwards along the minor radius of the elliptical cross-section. This difference in path length may be designed, by controlling the length of the major radius and the minor radius of the elliptical cross-section during lathing of the core sample 102, so as to provide the desired pressure distribution on an interior virtual surface of the core sample, where the interior virtual surface corresponds to the circular cylinder form that is used currently in typical core sample testing.

Figure 6A:
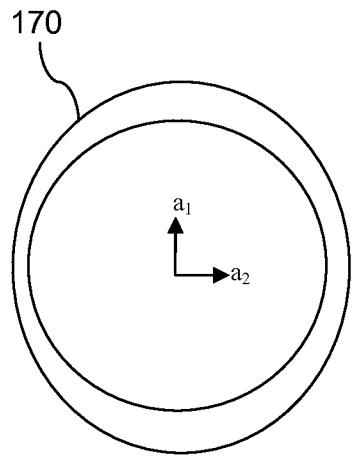
FIG. 6A is an illustration of a variable compliance sleeve according to an embodiment of the disclosure.
Figure 6B:
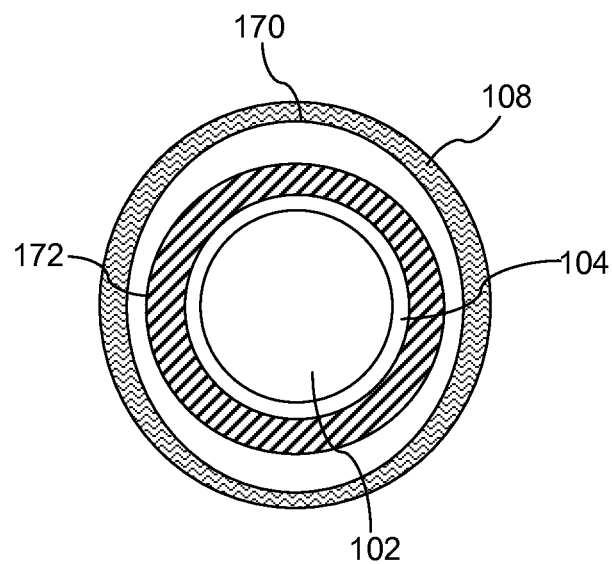
FIG. 6B is an illustration is an illustration of a variable compliance sleeve in a test configuration according to an embodiment of the disclosure.

Turning now to FIG. 6A and FIG. 6B, a compliance sleeve 170 is described. The compliance sleeve 170 may be inside of the impermeable bladder discussed above with reference to FIG. 1 and surrounding the impedance sleeve 104 and/or proppant. Alternatively, in an embodiment, the compliance sleeve 170 may replace the impermeable bladder and may itself be substantially impermeable. The compliance sleeve 170 is designed to have mechanical compliance or springyness that varies around a cross-section of the compliance sleeve 170 that is normal to the axis of the core sample 102. Expressed differently, the compliance sleeve 170 is designed to have mechanical compliance that varies radially and is constant axially. As noted above, mechanical compliance can be defined as the inverse of mechanical stiffness. The compliance sleeve 170 transfers the uniform forces applied by the uniform pressure of the first pressure chamber 108 to the outside surface of the compliance sleeve 170 as different forces to the outside of the impedance sleeve 104 (perhaps through the optional proppant material). For example, where the compliance sleeve 170 is illustrated as thicker, along the axis $a_1$ as illustrated in FIG. 6A, the compliance sleeve 170 would transfer relatively less of the incident force to the impedance sleeve 104, while where the compliance sleeve 170 is illustrated as thinner, along the axis a2 as illustrated in FIG. 6A, the compliance sleeve 170 would transfer relatively more of the incident force to the impedance sleeve 104. An example disposition of the compliance sleeve 170 in the test configuration is illustrated in FIG. 6B. The first pressure chamber 108 surrounds the compliance sleeve 170. the compliance sleeve 170 surrounds a layer of proppant material 172. The proppant material surrounds the impedance sleeve 104. The impedance sleeve 104 surrounds the core sample 102. The compliance sleeve 170 may promote modeling differences between a vertical overburden pressure and a horizontal overburden pressure, thereby enhancing the realism of the test conditions.

The compliance sleeve 170 may be made of a variety of materials. In an embodiment, the compliance sleeve 170 may be made of metal. In an embodiment, the compliance sleeve 170 may be made of an elastomeric material. In an embodiment, the compliance sleeve 170 may comprise an outer membrane, an inner membrane, and deformable beads sandwiched between the membranes such that when sufficient pressure is applied, the beads deform. The beads may be of variable deformability and/or of variable size to promote a different compliance at different locations around the compliance sleeve 170. The compliance sleeve 170 may be made of other materials.

Figure 7:
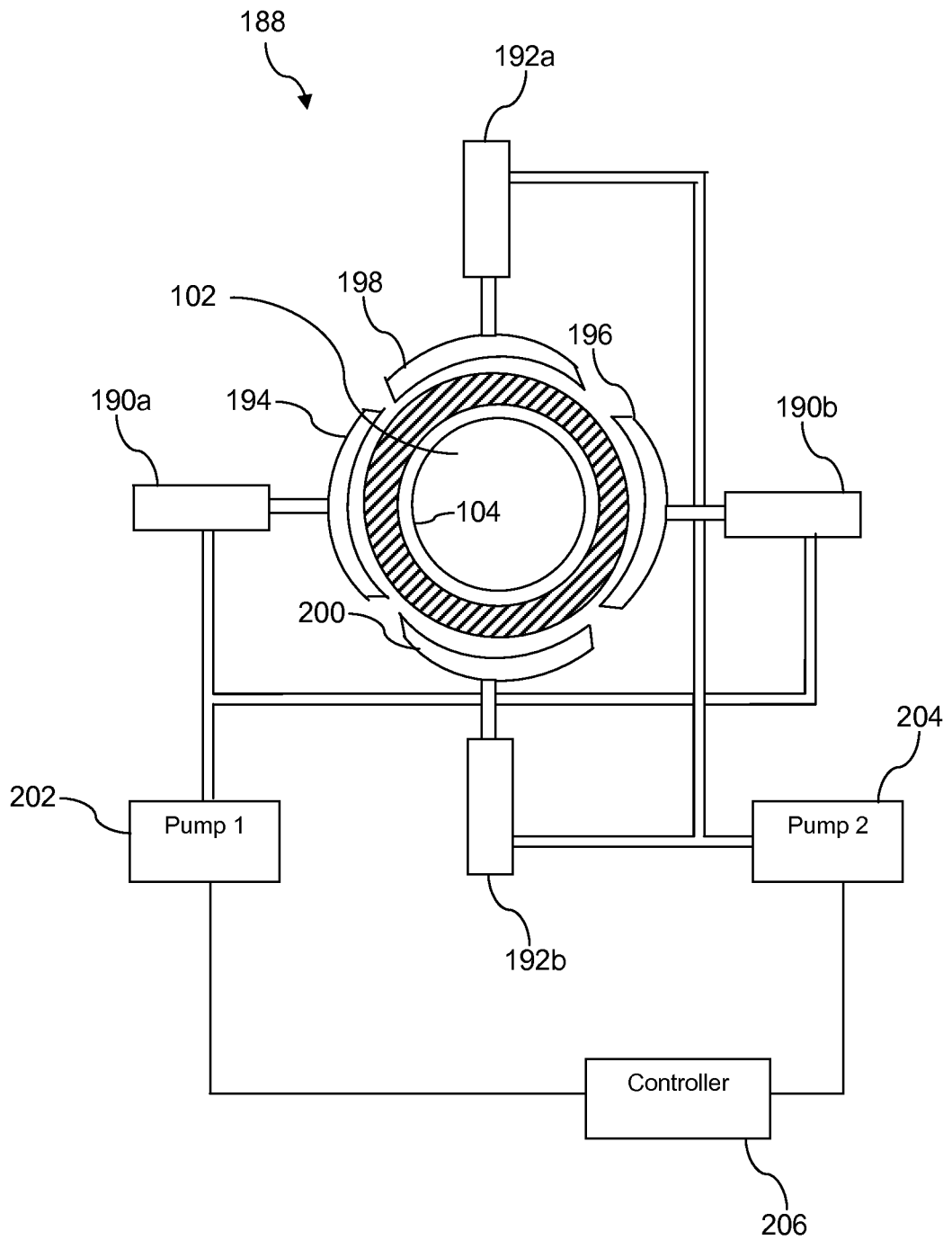
FIG. 7 is an illustration of a core sample test fixture suitable for providing overburden pressure according to an embodiment of the disclosure.

Turning now to FIG. 7, a first core sample test fixture 188 is described. The first core sample test fixture 188 comprises a first pair of actuators 190a, 190b that apply forces in opposite direction to each other along a first axis and a second pair of actuators 192a, 192b, that apply forces in opposite direction to each other along a second axis, wherein the first axis is normal, perpendicular, and/or orthogonal to the second axis. The first core sample test fixture 188 further comprises curved plates 194, 196, 198, and 200 through which the actuators 190a, 190b, 192a, and 192b, respectively, apply force to the impedance sleeve 104 and the core sample 102. The first core sample test fixture 188 further comprises a fourth pump 202, a fifth pump 204, and a controller 206. The fourth pump 202 is plumbed via tubing to the first pair of actuators 190a, 190b. The fifth pump 204 is plumbed via tubing to the second pair of actuators 192a, 192b. The two pairs of actuators 190a, 190b, 192a, 192b may be driven with different hydraulic pressures to apply a different force to the core sample 102 in the vertical axis from the force applied to the core sample 102 in the horizontal axis. The controller 206 may control the fourth and fifth pumps 202, 204 to provide the commanded or predefined force to the core sample 102. In an alternative embodiment, a single hydraulic pump may be employed to provide hydraulic pressure, and the controller 206 may modulate control valves to control the hydraulic pressure supplied to the actuators 190a, 190b, 192a, 192b. The controller 206 may modulate the control valves to supply different hydraulic pressures to first pair of actuators 190a, 190b versus the second pair of actuators 192a, 192b. In an alternative embodiment of the first core sample test fixture 188, the actuators 190a, 190b, 192a, 192b may be electrically actuated, and the controller 206 may control electric motors that provide motive force.

Figure 8:
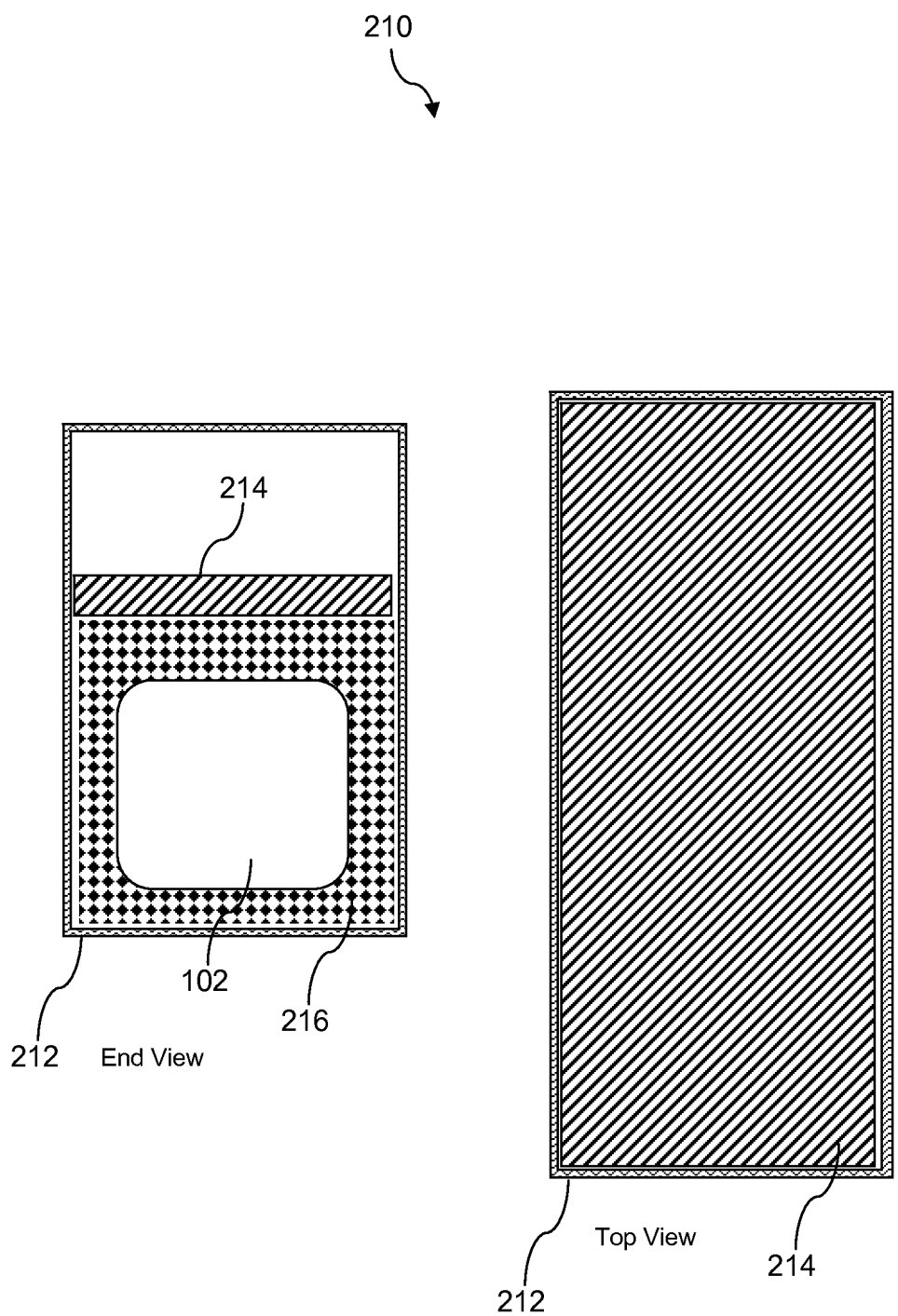
FIG. 8 is an illustration of a core sample text fixture suitable for providing overburden pressure according to an embodiment of the disclosure.

Turning now to FIG. 8, a second test fixture 210 is described. The second test fixture 210 comprises a containment 212, a piston 214, and a material 216. The material 216 may comprise gravel, sand, proppant, beads, or other material. The core sample 102 is surrounded by the material 216 within the containment 212. The core sample 102 for use in the second test fixture 210 may be a generally rectangular cross-section, as illustrated in the end view of FIG. 8, and may be generally a rectangular prism measuring about 4 inches by 4 inches by about 24 inches. Alternatively, the core sample 102 for use in the second test fixture 210 may be generally a rectangular prism measuring about 6 inches by 6 inches by about 24 inches. By applying force to the piston 214, the piston 214 displaces within the containment 212 to transfer the force to the top of the core sample 102 via the material 216.

The force may be applied to the piston 214 from a fluid or gas pressure introduced into the upper chamber. Alternatively, the force may be applied to the piston 214 from an actuator, such as a hydraulic actuator or an electric actuator. Although the material 216 may flow freely within the containment 212, the force applied to the core sample 102 by the material 216 may be greater in the vertical direction than in the horizontal direction. In an embodiment, the side walls of the containment 212 may be spring loaded and/or incorporate springs that give way slightly to reduce the horizontal component of the force transferred to the side of the core sample 102. The forces applied to the core sample 102 by the material 216 may simulate and/or model the effect of overburden pressure in a downhole environment. Fluid flow is free to flow around the material 216 and to apply fluid pressure to the core sample 102 that simulates and/or models formation fluid pressure in the downhole environment. The second test fixture 210 may be combined with aspects of the previously described innovations. For example, the impedance sleeve 104 described above may be employed when testing the core sample 102 using the second test fixture 210. One skilled in the art would readily be able to adapt the embodiments of the impedance sleeve 104 illustrated in FIG. 4A, FIG. 4B, and FIB 4C to the rectangular prism core sample 102 associated with the second test fixture 210.

Figure 9:
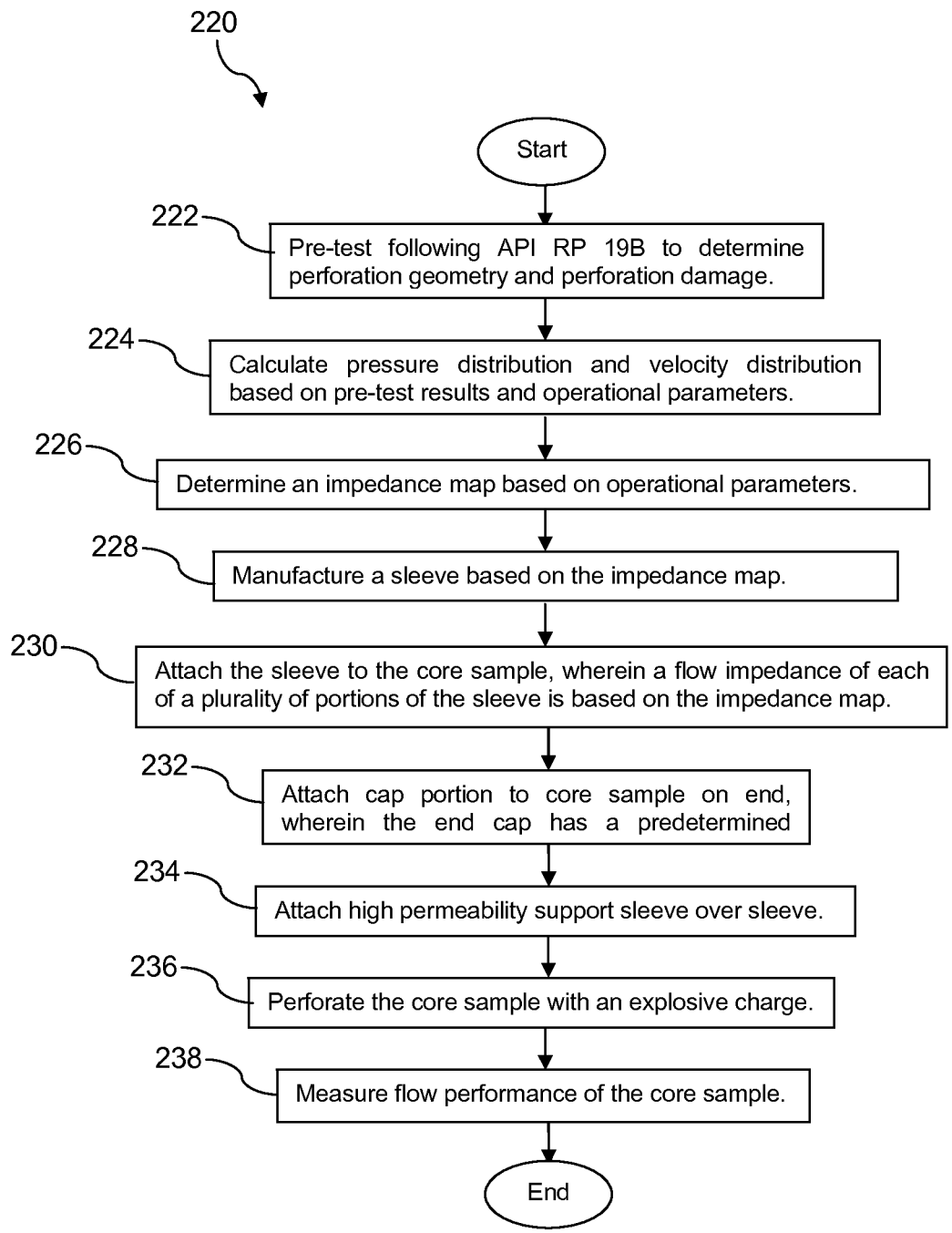
FIG. 9 is an illustration of a method of testing a core sample according to an embodiment of the disclosure.

Turning now to FIG. 9, a method 220 is described. At block 222, pre-testing is performed to determine perforation geometry and perforation damage. Pre-testing may follow guidance provided by API RP 19B. Pre-testing may involve conducting one or more preliminary tests and examining the core samples 102 after the preliminary tests. At block 224, a pressure distribution and a velocity distribution may be calculated based on the pre-test results and/or based on downhole operational parameters. The pressure distribution comprises the estimated values of pressure after perforation at different points on a virtual surface of the rock in the subterranean formation that the core sample is intended to simulate. Downhole, as fluid flows into the perforation tunnel in the formation, it is thought that the formation pressure at a distance from the perforation tunnel drops until it equals the pressure in the wellbore. The velocity distribution comprises the estimated value of fluid flow velocity crossing the virtual surface of the rock in the subterranean formation that the core sample is intended to simulate. The pressure distribution and the velocity distribution may be calculated by a variety of methods known to those skilled in the art. For example, the pressure distribution and velocity distribution may be calculated based on methods described in pages 145 through 158, in *Computer Aided Optimum Design of Structures VIII*, by James E. Brooks, published by WIT Press, 2003.

Downhole operational parameters may comprise one or more formation parameters, one or more perforation parameters, one or more wellbore parameters, and one or more core sample parameters. The formation parameters comprise rock permeability, rock type, overburden pressure, formation pressure, reservoir diameter, and reservoir height. The perforation parameters comprise penetration length, penetration shape, penetration damage, shot density, and gun phasing. The wellbore parameters comprise wellbore diameter, wellbore pressure, casing thickness, casing material, cement thickness, and cement type. The core sample parameters comprise core sample length and core sample diameter. One skilled in the art will appreciate that there may be other parameters that may be taken into consideration, depending upon the level of analysis elaboration and precision of test results desired. There is typically a trade off between increasing numbers of parameters and more detailed analysis versus complexity and time of completing the testing procedure.

At block 226 an impedance map is determined based on the downhole operational parameters. In an embodiment, the impedance may be determined based on the pressure distribution and the velocity distribution determined above at block 224. The impedance may be determined at every element of the impedance map using Eq. 2 described above. Thus, the impedance at an element is equal to the quotient of the pressure associated with the subject element by the pressure distribution divided by the fluid velocity associated with the subject element by the velocity distribution multiplied through by the appropriate proportionality constant to adapt to the units employed. This calculation may be performed for every element of the impedance map. The impedance map may be conceived to have a domain in a first dimension whose values correspond to displacement along the length of the axis of the core sample 102, a domain in a second dimension whose values correspond to displacement around the circumference of the cross-section of the core sample 102 (which may be referred to in some contexts as radial displacement), and a range in a third dimension whose values are the impedance associated with that location of the impedance map. The impedance map may be partitioned into a finite number of elements, for example, the impedance map may be partitioned or discretized into an eight-by-eight, sixty-four element map that corresponds to sixty-four portions of the tubular portion 140. The impedance map may be partitioned into any number of elements. The axial domain of the impedance map may be partitioned into any number of increments. The radial domain of the impedance map may be partitioned into any number of increments. A tubular portion 140 having sixty-four portions is illustrated in FIG. 4C. The impedance value of each map element, and hence the corresponding portion of the tubular portion 140, may have a different value from every other map element. Expressed in a different way, the impedance value of each map element may be independent of every other map element. In some embodiments, depending on operational parameters, some map elements may have substantially equal impedance values.

In one embodiment, the impedance of portions of the tubular portion 140 are of substantially equal value for all portions associated with the same position along the axis of the core sample 102, for example in this case the impedance map may be two dimensional. In this case, impedance values may have a different value for different values of the axial domain, but for any selected value of the axial domain, the impedance remains substantially equal at different values of the radial domain. For example, the impedance map may be partitioned into an eight element map that corresponds to eight portions of the tubular portion 140. A tubular portion 140 having eight portions is illustrated in FIG. 4B.

The impedance values in the impedance map, either three dimensional or two dimensional, may likewise be constrained to a discrete range of values. For example, the range of impedance values may be constrained to four different values, eight different values, twelve different values, or some other suitable number of values. Discretizing the impedance values may promote ease of manufacturing the tubular portion 140 and the impedance sleeve 104 generally.

At block 228, a sleeve is manufactured based on the impedance map. The sleeve may be manufactured from layers of filter material, for example filter paper, or from a ceramic material. Alternatively, the sleeve may be manufactured as a filter cake comprised of fine particle matter, such as fie silt, fine sand, fine clay, and/or other fine particle matter. In an embodiment, the sleeve may be manufactured to have impedance varying only over the axial domain and not varying over the radial domain, as illustrated in FIG. 4B. In this case, a three dimensional impedance map may be used, for example by using an average of impedance values at the same value in the axial domain, or alternatively a two dimensional impedance map may be used.

In an embodiment, the sleeve may correspond to the impedance sleeve 104 described above. Alternatively, the sleeve may correspond to the tubular section 140 described above. At block 230, the sleeve is attached to the core sample 102. In an embodiment, the sleeve may be secured to the core sample 102, for example using snap rings, clamps, wires, strings, and/or other attaching hardware. The flow impedance of each of a plurality of portions of the sleeve is based on the impedance map. At block 232, optionally the cap portion 142 is attached to the core sample 102 or to the tubular portion 140 of the impedance sleeve 104. The cap portion 142 has a predetermined flow impedance. The flow impedance of the cap portion 142 may vary from the center of the cap portion 142 out to the edges of the cap portion 142, for example having a greater flow impedance towards the curved perimeter of the cap portion 142 and a lesser flow impedance towards the center of the cap portion 142. At block 234, an optional support sleeve is attached over the sleeve. The support sleeve, as described above, may function to hold the sleeve in place and mitigate fluid infiltrating under the ends of the sleeve.

At block 236, the core sample is perforated, for example by detonating the explosive charge 116. At block 238, the flow performance of the core sample 102 is measured. It is understood that throughout the method 220, various pressures, pressure transients, fluid flows, and other parameters may be measured and recorded for later analysis. The results of analysis of the data gathered from testing the core sample 102 may be used to refine and elaborate the test parameters, and method 220 may be performed iteratively to refine and elaborate perforation parameters.

Figure 10:
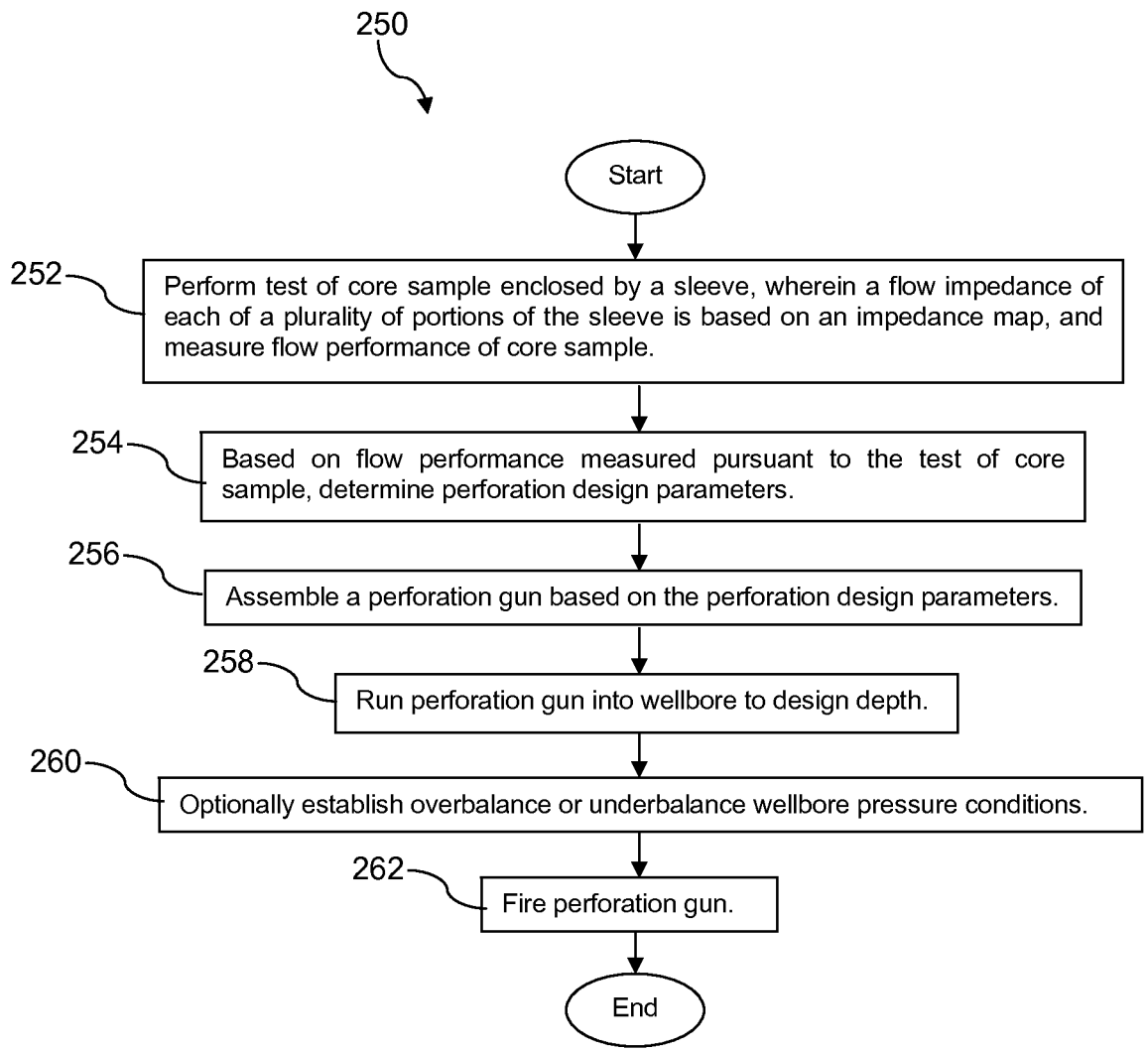
FIG. 10 is an illustration of a method of testing a core sample, determining perforation gun design parameters and/or perforation procedure parameters, and perforating a wellbore according to an embodiment of the disclosure.

Turning now to FIG. 10 a method 250 is described. At block 252, the core sample 102 enclosed by a sleeve is tested, wherein a flow impedance of each of a plurality of portions of the sleeve is based on a impedance map, and the flow performance of the core sample 102 is measured. The processing of block 252 may correspond substantially to one or more of the steps of method 220 described above with reference to FIG. 9. At block 254, based on the flow performance measured pursuant to the test of the core sample 102, determine perforation design parameters. Perforation design parameters may include one or more of shots per feet (density of shots), charge phasing, and the design of the explosive charge 116. Explosive charges 116 can be designed to release more or less energy; to direct their explosive energy with a relatively narrower or broader focus; to have different liner designs. An angle of the explosive charges 116 as determined by their mounting in the perforation gun, can be varied. At block 256, assemble a perforation gun based on the perforation design parameters.

At block 258, the perforation gun is run into a wellbore to design depth, for example a desired production depth. The perforation gun may have been at least partially assembled in a shop and transported to the wellbore location. Any remaining assembly of the perforation gun may be completed at the wellbore location, such as removing detonation safeties, installing detonators, and/or other final assembly steps. At block 260, optionally under balance or over balance wellbore pressure conditions may be established, for example by setting packers and applying appropriate pressure down a tubular string. At block 262, the perforation gun is fired, perforating the wellbore.

Figure 11:
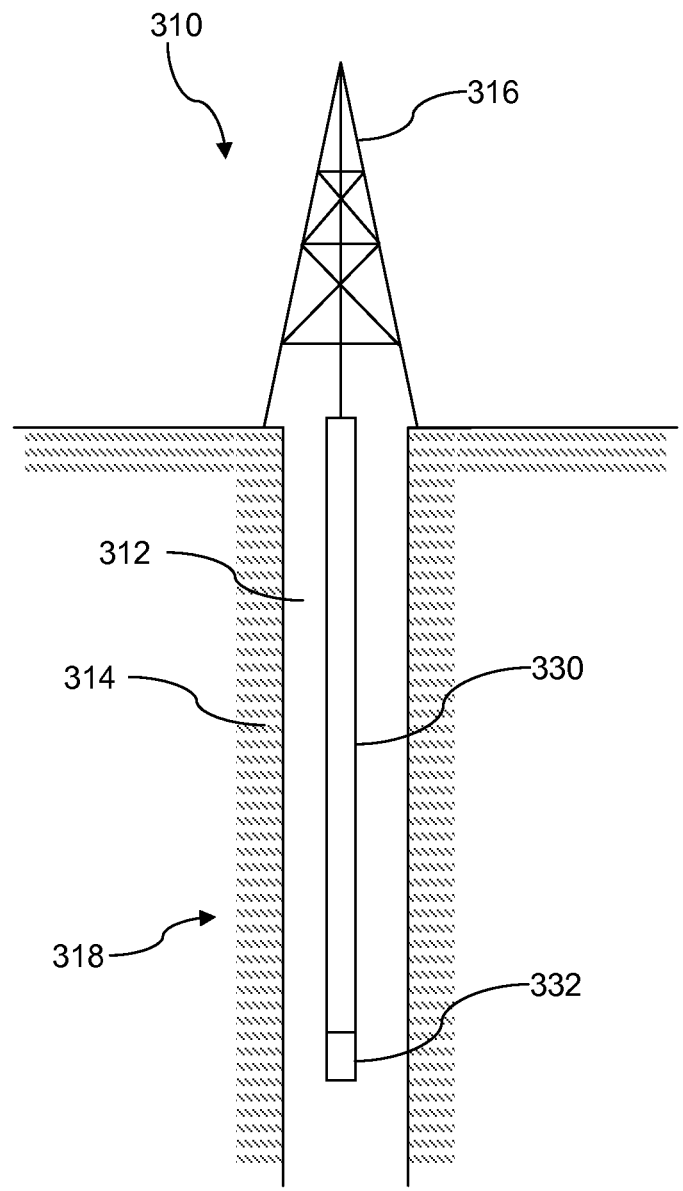
FIG. 11 is an illustration of a wellbore, a conveyance, and a perforation tool according to an embodiment of the disclosure.

Turning now to FIG. 11, a wellbore servicing system 310 is described. The system 310 comprises a servicing rig 316 that extends over and around a wellbore 312 that penetrates a subterranean formation 314 for the purpose of recovering hydrocarbons, storing hydrocarbons, disposing of carbon dioxide, or the like. The wellbore 312 may be drilled into the subterranean formation 314 using any suitable drilling technique. While shown as extending vertically from the surface in FIG. 11, in some embodiments the wellbore 312 may be deviated, horizontal, and/or curved over at least some portions of the wellbore 312. The wellbore 312 may be cased, open hole, contain tubing, and may generally comprise a hole in the ground having a variety of shapes and/or geometries as is known to those of skill in the art.

The servicing rig 316 may be one of a drilling rig, a completion rig, a workover rig, a servicing rig, or other mast structure and supports a workstring 318 in the wellbore 312, but in other embodiments a different structure may support the workstring 318, for example an injector head of a coiled tubing rigup. In an embodiment, the servicing rig 316 may comprise a derrick with a rig floor through which the workstring 318 extends downward from the servicing rig 316 into the wellbore 312. In some embodiments, such as in an off-shore location, the servicing rig 316 may be supported by piers extending downwards to a seabed. Alternatively, in some embodiments, the servicing rig 316 may be supported by columns sitting on hulls and/or pontoons that are ballasted below the water surface, which may be referred to as a semi-submersible platform or rig. In an off-shore location, a casing may extend from the servicing rig 16 to exclude sea water and contain drilling fluid returns. It is understood that other mechanical mechanisms, not shown, may control the run-in and withdrawal of the workstring 318 in the wellbore 312, for example a draw works coupled to a hoisting apparatus, a slickline unit or a wireline unit including a winching apparatus, another servicing vehicle, a coiled tubing unit, and/or other apparatus.

In an embodiment, the workstring 318 may comprise a conveyance 330, a perforation tool 332, and other tools and/or subassemblies (not shown) located above or below the perforation tool 332, for example a surge sub-assembly, one or more packers, and other sub-assemblies. The conveyance 330 may comprise any of a string of jointed pipes, a slickline, a coiled tubing, a wireline, and other conveyances for the perforation tool 332. In an embodiment, the perforation tool 332 comprises one or more explosive charges that may be triggered to explode, perforating a casing if present, perforating a wall of the wellbore 312 and forming perforations or tunnels out into the subterranean formation 314. The perforating may promote recovering hydrocarbons from the subterranean formation 314 for production at the surface, storing hydrocarbons flowed into the subterranean formation 314, or disposing of carbon dioxide in the subterranean formation 314, or the like.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of testing a core sample, comprising:
   determining an impedance map;
   attaching a permeable sleeve to the core sample, wherein a flow impedance of each of a plurality of portions of the permeable sleeve is based on the impedance map;
   flowing a fluid through the permeable sleeve and into the core sample; and
   measuring a flow performance of the core sample.

2. The method of claim 1, wherein the impedance map is determined based on at least one of a formation parameter, a perforation parameter, a wellbore parameter, and a core sample parameter.

3. The method of claim 2, wherein the formation parameter comprises one of a rock permeability, a rock type, an overburden pressure, a formation pressure, a reservoir diameter, and a reservoir height; wherein the perforation parameter comprises one of a penetration length, a penetration shape, a penetration damage, a shot density, and a gun phasing; wherein the wellbore parameter comprises one of a wellbore diameter, a wellbore pressure, a casing thickness, a casing material, a cement thickness, and a cement type; and wherein the core sample parameter comprises one of a core sample length and a core sample diameter.

4. The method of claim 1, wherein portions of the sleeve that are equal distance from an end of the core sample have the same flow impedance.

5. The method of claim 4, further comprising:
   determining an elliptical cross section based on a rock permeability; and
   shaping the core sample to have the determined elliptical cross section.

6. The method of claim 1, wherein at least two portions of the sleeve that are equal distance from an end of the core sample have different flow impedance and wherein at least two portions of the sleeve that are at different distances from an end of the core sample have different flow impedance.

7. The method of claim 1, further comprising:
   determining a pressure differential associated to each of the portions of the sleeve based on at least one of a formation parameter, a perforation parameter, a wellbore parameter, and a core sample parameter;
   determining a flow velocity associated to each of the portions of the sleeve based on at least one of a formation parameter, a perforation parameter, a wellbore parameter, and a core sample parameter, and
   wherein the impedance map is determined at least in part based on the pressure differentials associated to each of the portions of the sleeve and based on the flow velocities associated to each of the portions of the sleeve.

8. The method of claim 1, further comprising modifying a pressure transient that occurs after the core sample is perforated, where the pressure transient is modified by fluid flow into an interior of a surge device, wherein the surge device comprises a piston, an interior chamber, and a crushable spring, wherein the piston mass, the volume of the interior chamber, and the spring constant of the crushable spring are designed to produce the modified pressure transient.

9. The method of claim 1, wherein the impedance map comprises a plurality of elements, and wherein an impedance of at least one element of the plurality of elements is determined as a quotient of a pressure associated with the at least one element by a pressure distribution divided by a fluid velocity associated with the at least one element by the velocity distribution.

10. The method of claim 1, further comprising manufacturing the sleeve based on the impedance map.

11. The method of claim 1, wherein the sleeve comprises layers of filter paper, and wherein a number of layers at each portion of the sleeve corresponds to a flow impedance at the corresponding portion.

12. The method of claim 1, wherein the sleeve comprises a ceramic material.

13. The method of claim 1, wherein the sleeve comprises a filter cake formed of particle matter.

* * * * *